(12) United States Patent
Tochino et al.

(10) Patent No.: US 12,483,513 B2
(45) Date of Patent: Nov. 25, 2025

(54) SIGNAL TRANSFER DEVICE, SIGNAL TRANSFER METHOD, SIGNAL TRANSFER PROGRAM, AND SIGNAL TRANSFER SYSTEM

(71) Applicant: NTT, Inc., Tokyo (JP)

(72) Inventors: Takamitsu Tochino, Musashino (JP); Tatsuya Shimada, Musashino (JP); Keita Takahashi, Musashino (JP); Yoshihito Sakai, Musashino (JP)

(73) Assignee: NTT, Inc., Tokyo (JP)

( * ) Notice: Subject to any disclaimer, the term of this patent is extended or adjusted under 35 U.S.C. 154(b) by 302 days.

(21) Appl. No.: 18/283,044

(22) PCT Filed: Mar. 23, 2021

(86) PCT No.: PCT/JP2021/011890
§ 371 (c)(1),
(2) Date: Sep. 20, 2023

(87) PCT Pub. No.: WO2022/201288
PCT Pub. Date: Sep. 29, 2022

(65) Prior Publication Data
US 2024/0171521 A1    May 23, 2024

(51) Int. Cl.
*H04L 47/6275* (2022.01)
*H04L 47/56* (2022.01)
*H04L 49/9047* (2022.01)

(52) U.S. Cl.
CPC .......... *H04L 47/6275* (2013.01); *H04L 47/56* (2013.01); *H04L 49/9047* (2013.01)

(58) Field of Classification Search
CPC .. H04L 47/6275; H04L 47/56; H04L 49/9047
See application file for complete search history.

(56) References Cited

U.S. PATENT DOCUMENTS

2019/0132149 A1   5/2019   Mangin
2023/0113911 A1*  4/2023   Nomura ................ H04L 47/22
                                                      370/230

FOREIGN PATENT DOCUMENTS

JP    2008-219080    9/2008
JP    2019-503147    1/2019

OTHER PUBLICATIONS

[No Author Listed], "IEEE Standard for Local and Metropolitan area Networks-Time-Sensitive Networking for Fronthaul," IEEE Computer Society, May 2018, 62 pages.

(Continued)

*Primary Examiner* — Siming Liu
(74) *Attorney, Agent, or Firm* — Fish & Richardson P.C.

(57) ABSTRACT

A signal transfer device according to an embodiment receives a plurality of signals including an aperiodic signal having a higher priority than other signals, respectively holds the plurality of received signals by a plurality of buffers according to the priority, acquires signal information including at least one of a time at which the aperiodic signal is transmitted or received and a data length of the aperiodic signal, predicts a timing at which the aperiodic signal arrives at the buffer based on the acquired signal information, sets reservation of a period for transmitting the aperiodic signal with priority over other signals based on the predicted timing, controls the plurality of buffers to output the aperiodic signal with priority over other signals in the period in which the reservation is set, and transmits the signal output by the buffer.

8 Claims, 8 Drawing Sheets

(56) References Cited

OTHER PUBLICATIONS

Hasegawa et al., "Chapter 4 Practical quality control," The Institute of Electronics, Information and Communication Engineers, Knowledge Base, Group 3, Jun. 9, 2011, 5(4):1-21, 42 pages (with machine translation).

Shibata et al., "Traffic Control Techniques in Layer-2 Network for Multi-service Accommodation toward 5G/IoT era," IEICE Technical Report, 2018, 6 pages (with English abstract).

Tochino et al., "First demonstration of mini-pon by using standard-based DBA-API and software components on commodity server apart from modular OLT," 45th European Conference on Optical Communication (ECOC 2019), Dublin, Ireland, Sep. 22-26, 2019, 4 pages.

\* cited by examiner

SIGNAL TRANSFER DEVICE, SIGNAL TRANSFER METHOD, SIGNAL TRANSFER PROGRAM, AND SIGNAL TRANSFER SYSTEM

CROSS-REFERENCE TO RELATED APPLICATIONS

This application is a National Stage application under 35 U.S.C. § 371 of International Application No. PCT/JP2021/011890, having an International Filing Date of Mar. 23, 2021.

The disclosure of the prior application is considered part of the disclosure of this application, and is incorporated by reference in its entirety into this application.

TECHNICAL FIELD

The present invention relates to a signal transfer device, a signal transfer method, a signal transfer program, and a signal transfer system.

BACKGROUND ART

As high-speed and broadband Ethernet (registered trademark) communication, for example, Gigabit Ethernet-PON (GE-PON) which is optical point to multipoint is known. Typically, packets are delayed when going through a switch. Therefore, various technologies are applied to realize a low-delay network.

For example, Non Patent Literature 1 defines bridges and LANs for networks requiring low delay. In addition, Non Patent Literature 2 discloses a technique for controlling the quality of communication by reserving a network resource.

In addition, a time aware shaper (TAS) technique for preventing a collision delay is known as one of techniques for reducing packet delay. In the TAS, the complete priority control is performed, and the transmission time slot is reserved (open gate and close gate with other priority) in the signal transfer device for the signal of the priority to be the priority control target that is periodically transmitted. In the priority transmission section, signals with other priorities cannot be transmitted (kept waiting). Furthermore, in the complete priority control, the signal transfer device receives a signal to be subjected to the priority control, and opens a corresponding time gate when transmission of a currently transmitted signal ends after the signal becomes transmittable.

In addition, Non Patent Literature 3 discloses a technology for implementing dynamic bandwidth allocation (DBA), and Non Patent Literature 4 discloses a technology in which a TAS is improved in order to improve bandwidth utilization efficiency of traffic.

CITATION LIST

Non Patent Literature

Non Patent Literature 1: "IEEE Standard for Local and metropolitan area networks-Time-Sensitive Networking for Fronthaul", IEEE Std 802.1CM, May 7, 2018
Non Patent Literature 2: The Institute of Electronics, Information and Communication Engineers "Knowledge Base," Group 3 (Computer Network)-5th edit (Communication Quality), Chapter 4 Practical quality control, 2011, pp. 1-21
Non Patent Literature 3: Takamitsu Tochino, et al., "FIRST DEMONSTRATION OF MINI-PON BY USING STANDARD-BASED DBA-API AND SOFTWARE COMPONENTS ON COMMODITY SERVER APART FROM MODULAR OLT", ECOC2019
Non Patent Literature 4: Naotake SHIBATA and three others, "Traffic Control Techniques in Layer-2 Network for Multi-service Accommodation toward 5G/IoT era," The Institute of Electronics, Information and Communication Engineers, IEICE Technical Report, 2018

SUMMARY OF INVENTION

Technical Problem

However, the TAS can be applied only to periodic traffic, and cannot be applied in a case where a signal to be controlled with a low delay is an aperiodic signal. In addition, in a case where a signal of another priority is transmitted, there is a problem that even a signal to be controlled with a low delay cannot be transmitted until the transmission of the signal is completed, and a delay occurs.

The present invention has been made in view of the above-described problems, and an object thereof is to provide a signal transfer device, a signal transfer method, a signal transfer program, and a signal transfer system capable of reducing a delay even when a signal to be subjected to priority control is an aperiodic signal.

Solution to Problem

A signal transfer device according to an embodiment of the present invention includes a reception unit that receives a plurality of signals including the aperiodic signal having a higher priority than other signals, a plurality of buffers that respectively hold the plurality of signals received by the reception unit according to priorities, an acquisition unit that acquires signal information including at least one of a time at which the aperiodic signal is transmitted or received and a data length of the aperiodic signal, a prediction unit that predicts a timing at which the aperiodic signal arrives at the buffer based on the signal information acquired by the acquisition unit, a setting unit that sets reservation of a period during which the aperiodic signal is transmitted in preference to other signals based on the timing predicted by the prediction unit, a control unit that performs control such that the aperiodic signal is output in preference to other signals from the plurality of buffers during a period in which the setting unit sets reservation, and a transmission unit that transmits signals output from the plurality of buffers according to the control of the control unit.

In addition, a signal transfer method according to an embodiment of the present invention includes a reception step of receiving a plurality of signals including an aperiodic signal having a higher priority than other signals, a holding step of holding the plurality of received signals by a plurality of buffers according to priorities, an acquisition step of acquiring signal information including at least one of a time at which the aperiodic signal is transmitted or received and a data length of the aperiodic signal, a prediction step of predicting a timing at which the aperiodic signal arrives at the buffer based on the acquired signal information, a setting step of setting reservation of a period during which the aperiodic signal is transmitted in preference to other signals based on the predicted timing, a control step of performing control such that the aperiodic signal is output in preference to other signals from the plurality of buffers during a period in which reservation is set, and a transmission step of transmitting signals output from a plurality of the buffers according to the control in the control step.

In addition, a signal transfer system according to an embodiment of the present invention includes a transmission device that transmits one or more signals including an aperiodic signal having a higher priority than other signals, and a signal transfer device that transfers a plurality of signals including the aperiodic signal to a reception device, in which the signal transfer device includes a reception unit that receives a plurality of signals including an aperiodic signal, a plurality of buffers that respectively hold the plurality of signals received by the reception unit according to priorities, an acquisition unit that acquires signal information including at least one of a time at which the aperiodic signal is transmitted or received and a data length of the aperiodic signal, a prediction unit that predicts a timing at which the aperiodic signal arrives at the buffer based on the signal information acquired by the acquisition unit, a setting unit that sets reservation of a period during which the aperiodic signal is transmitted in preference to other signals based on the timing predicted by the prediction unit, a control unit that performs control such that the aperiodic signal is output in preference to other signals from the plurality of buffers during a period in which the setting unit sets reservation, and a transmission unit that transmits signals output from the plurality of buffers according to the control of the control unit.

Advantageous Effects of Invention

According to the present invention, even when a signal to be subjected to priority control is an aperiodic signal, delay can be reduced.

DESCRIPTION OF EMBODIMENTS

Figure 8:
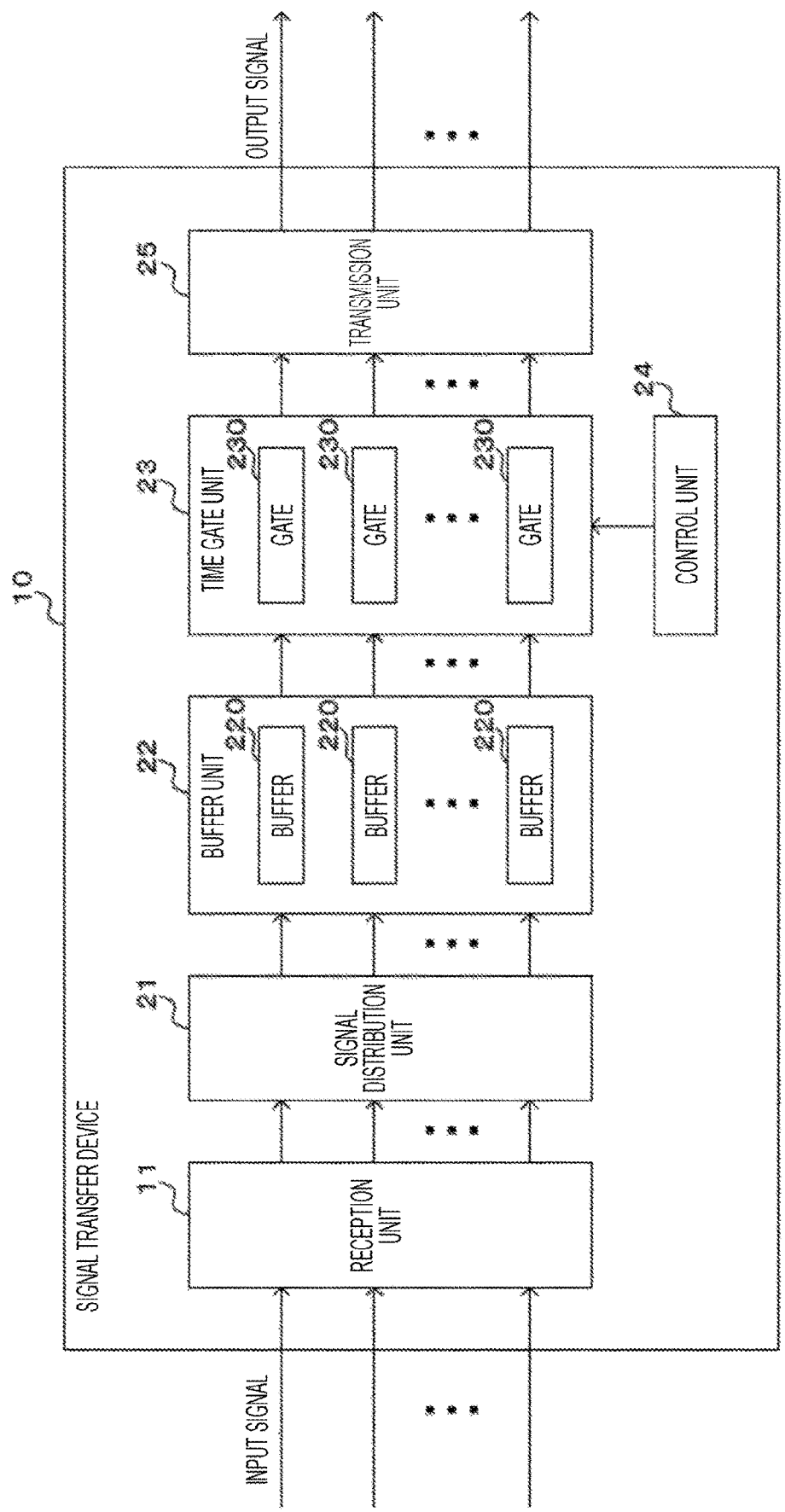
FIG. 8 is a diagram illustrating a configuration example of a signal transfer device of a comparative example.

First, the background of the present invention will be described. FIG. 8 is a diagram illustrating a configuration example of a signal transfer device 10 of a comparative example. The signal transfer device 10 includes, for example, a reception unit 11, a signal distribution unit 21, a buffer unit 22, a time gate unit 23, a control unit 24, and a transmission unit 25, receives a signal transmitted by a transmission device (not illustrated), and transmits (transfers) the signal to a reception device (not illustrated).

The reception unit 11 receives a plurality of signals including periodic signals having higher priority than other signals, for example, and outputs the received signals to the signal distribution unit 21.

The signal distribution unit 21 has a function of distributing the signals input from the reception unit 11 for each priority, and outputs the signals distributed for each priority to the buffer unit 22.

The buffer unit 22 includes a plurality of buffers 220 that hold signals for each priority, and the plurality of buffers 220 hold the signals distributed by the signal distribution unit 21 for each priority. That is, the plurality of buffers 220 hold the plurality of signals received by the reception unit 11 according to the priority.

The time gate unit 23 includes a plurality of gates 230 respectively corresponding to the plurality of buffers 220. The gate 230 transmits the signal held by the buffer 220 to the transmission unit 25 by opening, and stops the transmission of the signal held by the buffer 220 to the transmission unit 25 by closing.

The control unit 24 is a scheduler that controls signal transmission for each buffer 220 by controlling opening and closing of each of the plurality of gates 230 included in the time gate unit 23 according to schedule information notified from the outside or predetermined schedule information, for example.

For example, in a case where the TAS is executed according to schedule information notified from the outside, the control unit 24 performs control to open the gate 230 at a timing determined based on the period information, the phase information, and the data length of the signal included in the schedule information. In addition, in a case where the complete priority control is performed according to predetermined schedule information, the control unit 24 performs control to give priority to the buffer 220 holding a signal having a high priority and to open the corresponding gate 230.

The transmission unit 25 has a transfer function of transmitting a signal in which the gate 230 is opened to a designated output destination. That is, the transmission unit 25 transmits the signals output from the plurality of buffers 220 according to the control of the control unit 24.

In a case where the reception unit 11 receives a periodic signal having a higher priority than other signals, the signal transfer device 10 can perform the complete priority control by the conventional TAS. However, in a case where the reception unit 11 receives a plurality of signals including an aperiodic signal having a higher priority than other signals, the signal transfer device 10 cannot perform the complete priority control by the conventional TAS. Furthermore, in a case where the signal transfer device 10 transmits a signal of another priority, the signal transfer device cannot transmit an aperiodic signal having a higher priority than the other signals until the transmission of the signal is completed, and a delay occurs.

Therefore, a signal transfer device according to an embodiment to be described next is configured to be able to reduce a delay of an aperiodic signal having a high priority and transfer the aperiodic signal even when receiving a plurality of signals including an aperiodic signal having a higher priority than other signals. Hereinafter, the asynchronous signal is assumed to be an example of an aperiodic signal.

Figure 1:
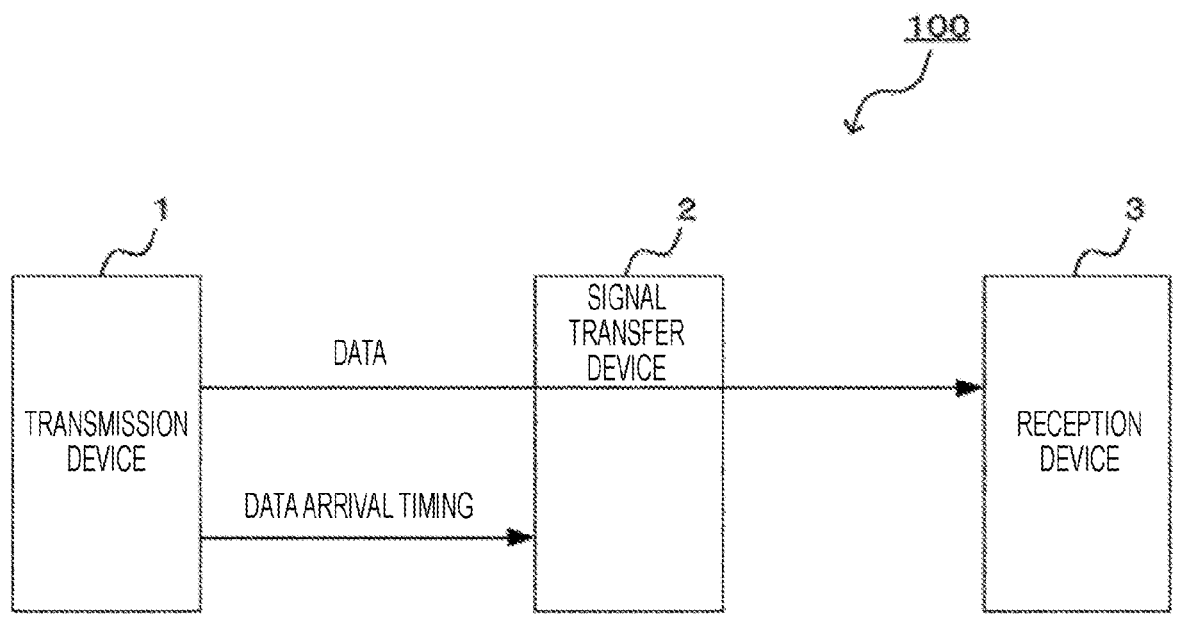
FIG. 1 is a diagram illustrating a configuration example of a signal transfer system according to an embodiment.

FIG. 1 is a diagram illustrating a configuration example of a signal transfer system 100 according to an embodiment. For example, the signal transfer system 100 is configured such that a signal transfer device 2 transfers a signal (data) transmitted by the transmission device 1 to the reception device 3.

For example, the signal transfer device 2 acquires information indicating an arrival timing of a signal transmitted by the transmission device 1, and transfers a plurality of signals transmitted by the transmission device 1 to the reception device 3 so as to reduce a delay of an aperiodic signal having a higher priority than other signals.

Note that a plurality of signal transfer devices 2 may be arranged between the transmission device 1 and the reception device 3. In this case, the plurality of signal transfer devices 2 sequentially transfer the signals transmitted by the transmission device 1 and transmit the signals to the reception device 3.

Furthermore, the signal transfer system 100 may be provided with a signal transfer control device that determines which path among the plurality of signal transfer devices 2 a signal is to be transmitted through in a network constituted by the plurality of signal transfer devices 2 and issues a command to the control unit 24 of each signal transfer device 2.

Figure 2:
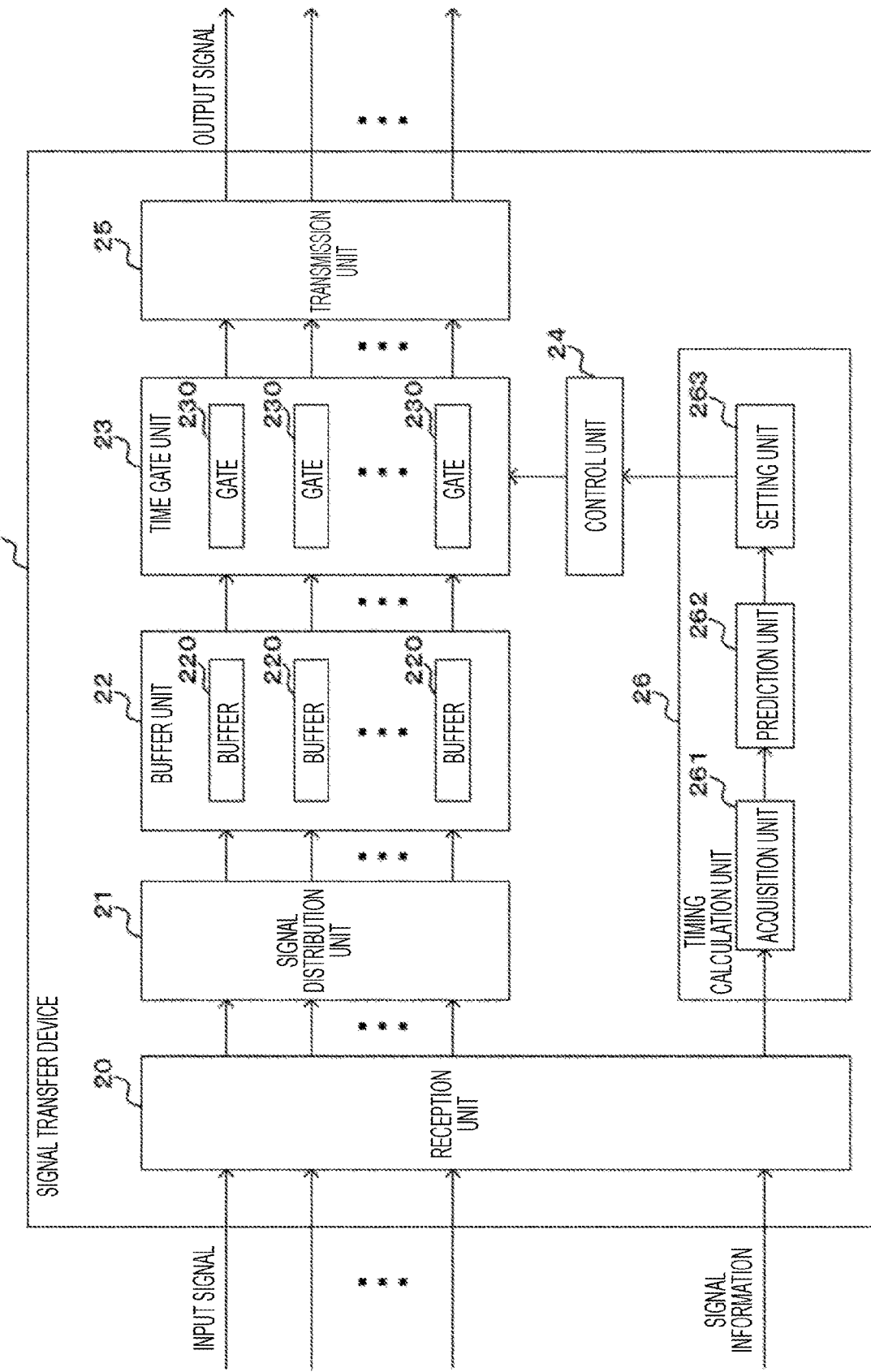
FIG. 2 is a diagram illustrating a configuration example of a signal transfer device according to an embodiment.

FIG. 2 is a diagram illustrating a configuration example of the signal transfer device 2 according to an embodiment. As illustrated in FIG. 2, the signal transfer device 2 includes a reception unit 20, a signal distribution unit 21, a buffer unit 22, a time gate unit 23, a control unit 24, a transmission unit 25, and a timing calculation unit 26. Note that, in the signal transfer device 2 illustrated in FIG. 2, substantially the same components as those of the signal transfer device 10 illustrated in FIG. 8 are denoted by the same reference numerals.

The reception unit 20 receives a plurality of signals including an aperiodic signal having a higher priority than the other signals, and outputs each of the received signals to the signal distribution unit 21. Further, the reception unit 20 receives the signal information including at least one of the time when the asynchronous signal which is the aperiodic signal is transmitted or received and the data length of the asynchronous signal, and outputs the received signal information to the timing calculation unit 26.

Note that the reception unit 20 may receive, for example, either a signal whose priority is determined in units of transmission devices 1 that transmit a plurality of signals or a signal whose priority is determined in units of signal flows.

The timing calculation unit 26 includes an acquisition unit 261, a prediction unit 262, and a setting unit 263, calculates a timing at which an aperiodic signal having a higher priority than other signals is transferred, and performs setting for the control unit 24.

The acquisition unit 261 acquires signal information including, for example, at least one of the time when the aperiodic signal is transmitted by the transmission device 1, the time when the aperiodic signal is received by the signal transfer device 2, or the data length of the aperiodic signal from the signal information output by the reception unit 20, and outputs the acquired signal information to the prediction unit 262.

For example, in a case where the time at which the aperiodic signal is transmitted or received is predetermined, the acquisition unit 261 may acquire the signal information including only the data length (or the data transmission time) of the aperiodic signal.

As a specific example, when the transmission device 1 adds control information recognizable by the signal transfer device 2 to the end of data and transmits the control information, the signal transfer device 2 can recognize the control information to grasp the data transmission time.

Furthermore, in a case where the data length (or the data transmission time) of the aperiodic signal is predetermined, the acquisition unit 261 may acquire signal information including only the time at which the aperiodic signal is transmitted or received.

The prediction unit 262 predicts the timing at which the aperiodic signal arrives at, for example, the signal transfer device 2 or the buffer 220 based on the signal information acquired by the acquisition unit 261, and outputs information indicating the predicted timing to the setting unit 263.

Based on the timing predicted by the prediction unit 262, the setting unit 263 sets, for the control unit 24, a reservation for a period in which an aperiodic signal is transmitted in preference to other signals.

Therefore, the control unit 24 controls the time gate unit 23 so that the aperiodic signal is output from the plurality of buffers 220 in preference to other signals during the period in which the setting unit 263 sets the reservation.

First Embodiment

Figure 3:
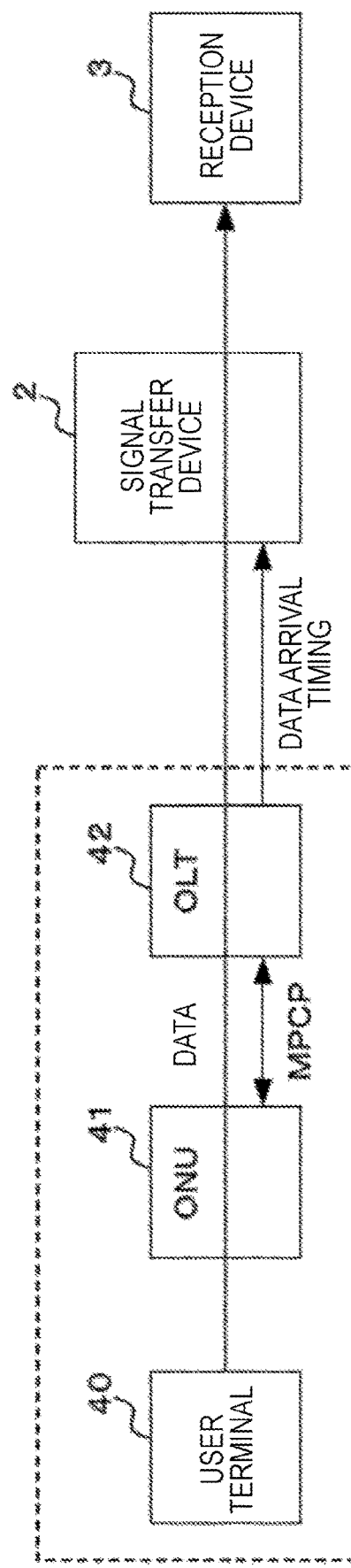
FIG. 3 is a diagram illustrating a first embodiment of a signal transfer system.

Next, a specific first embodiment of the signal transfer system 100 will be described. FIG. 3 is a diagram illustrating a first example (passive optical network (PON)) of the signal transfer system 100.

The user terminal 40 is a device that is used by a user to generate traffic, and is connected to an optical network unit (ONU) 41. The ONU 41 is accommodated in an optical line terminal (OLT) 42. The ONU 41 and the OLT 42 are devices described in IEEE 802.3 SECTION 5 or the like. The OLT 42 controls signal transmission timing of (a plurality of) ONU 41 in an optical network of a point-to-point (P2MP) topology. At this time, the user terminal 40, the ONU 41, and the OLT 42 correspond to the transmission device 1 illustrated in FIG. 1.

First Operation Example

The priority signal is to identify traffic to be prioritized using an identifier that can be uniquely identified. For example, information for specifying the ONU 41, a logical link ID (LLID), a transmission source address, a transmission destination address, information indicating priority, or the like is used as the identifier.

The priority signal is buffered by the ONU 41 in a queue independent of other signals. The OLT 42 recognizes the data amount (data length) of the buffered priority signal by the report message from the ONU 41. In addition, in the OLT 42, each ONU 41 recognizes a signal transmission start time by a bandwidth allocation method such as dynamic bandwidth allocation (DBA), for example. Then, the OLT 42 transmits the data amount and the transmission start time to the signal transfer device 2 as signal information (asynchronous signal information).

In the signal transfer device 2, the timing calculation unit 26 calculates the timing to open the gate 230 corresponding to the buffer 220 (FIG. 2) holding the priority signal using the received signal information and, for example, a preset transmission delay.

Note that the signal transfer device 2 may recognize the transmission delay time by measuring the transmission delay between the OLT 42 and the signal transfer device 2 using a technique similar to the conventional TAS or the like. In addition, since the transmission distance between the ONU 41 and the OLT 42 is maintained, the signal transfer device 2 may acquire information indicating a transmission delay based on the transmission distance.

The timing calculation unit 26 outputs a command to reserve in advance to open the gate 230 for the priority signal at the calculated timing to the control unit 24. The control unit 24 controls the time gate unit 23 in accordance with a command from the timing calculation unit 26, and causes the transmission unit 25 to transmit the priority signal. Thereafter, the control unit 24 controls the time gate unit 23 to cause the transmission unit 25 to transmit other signals.

Note that the OLT 42 may calculate a timing at which the gate 230 is opened with respect to the priority signal and transmit the calculated timing to the signal transfer device 2 as signal information. In this case, the signal information indicates "time to open the gate 230" and "time period when the gate 230 is opened".

Second Operation Example

For example, it is assumed that all the signals output from an arbitrary ONU 41 among the plurality of ONUs 41 are priority signals. At this time, the ONU 41 buffers the priority signal. The OLT 42 recognizes the signal transmission start time and the signal transmission time of the ONU 41 by band allocation to the ONU 41. Thereafter, the control unit 24 controls the time gate unit 23 in accordance with a command from the timing calculation unit 26, and causes the transmission unit 25 to transmit the priority signal.

Note that the signal transfer device 2 may set the transmission delay in advance, may predict (learn) the transmission delay, or may measure the transmission distance to acquire the transmission delay.

Second Embodiment

Figure 4:
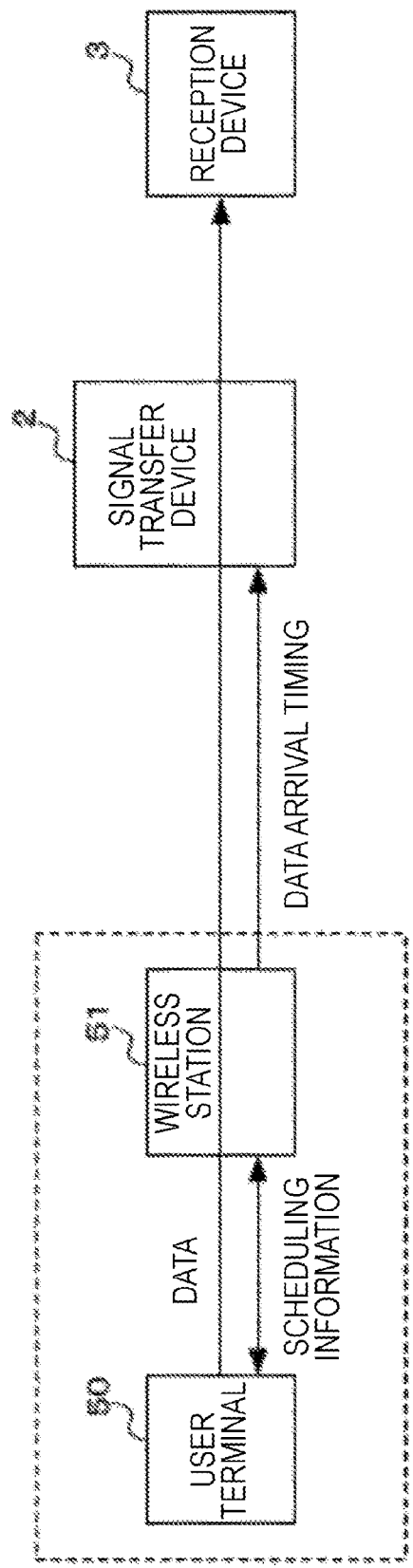
FIG. 4 is a diagram illustrating a second embodiment of a signal transfer system.

Next, a specific second embodiment of the signal transfer system 100 will be described. FIG. 4 is a diagram illustrating a second example (wireless network) of the signal transfer system 100.

The user terminal 50 is a terminal that is used by a user to generate traffic and perform wireless communication, and is accommodated in a wireless station 51. The wireless station 51 is a base station, an access point in WiFi (registered trademark), or the like, and controls a signal transmission timing of (a plurality of) the user terminals 50 in the wireless network of the P2MP topology. At this time, the user terminal 50 and the wireless station 51 correspond to the transmission device 1 illustrated in FIG. 1.

The priority signal is to identify traffic to be prioritized using an identifier that can be uniquely identified. For example, a transmission source address, a transmission destination address, information indicating priority, or the like is used as the identifier.

The wireless station 51 schedules a time and a data amount at which the user terminal 50 transmits a signal to the wireless station 51 in advance, and transmits the time and the data amount at which the signal is transmitted to the signal transfer device 2 as signal information.

In the signal transfer device 2, the timing calculation unit 26 calculates the timing to open the gate 230 corresponding to the buffer 220 (FIG. 2) holding the priority signal using the received signal information and, for example, a preset transmission delay.

The timing calculation unit 26 outputs a command to reserve in advance to open the gate 230 for the priority signal at the calculated timing to the control unit 24. The control unit 24 controls the time gate unit 23 in accordance with a command from the timing calculation unit 26, and causes the transmission unit 25 to transmit the priority signal. Thereafter, the control unit 24 controls the time gate unit 23 to cause the transmission unit 25 to transmit other signals.

Third Embodiment

Figure 5:
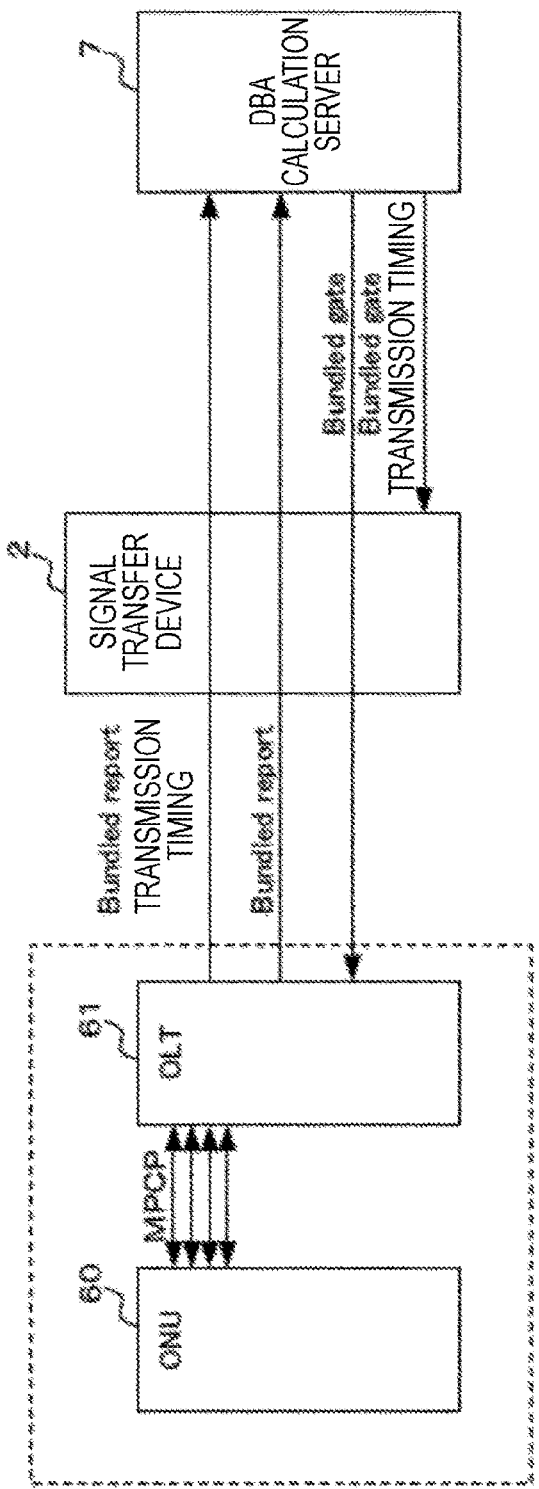
FIG. 5 is a diagram illustrating a third embodiment of a signal transfer system.
Figure 6:
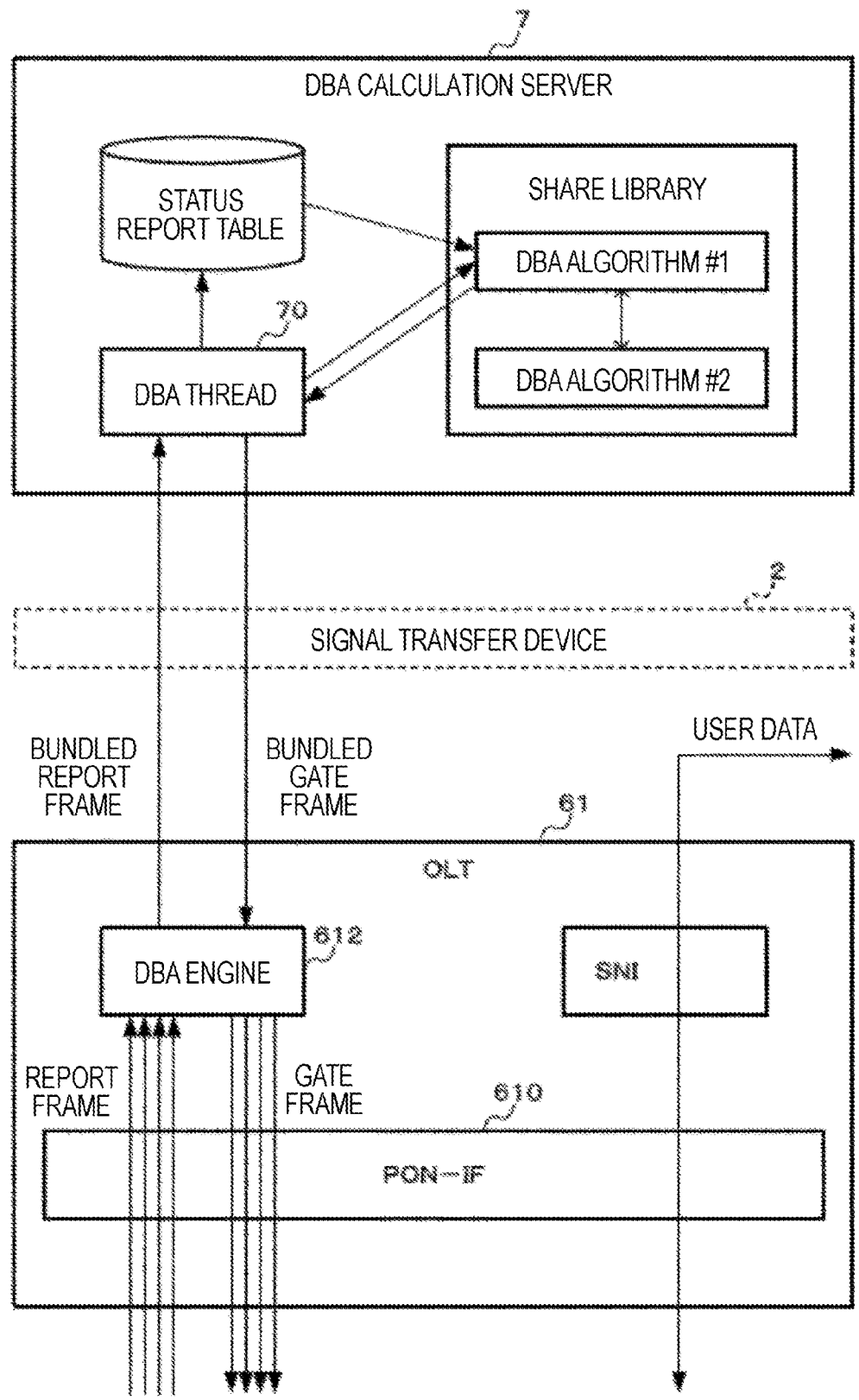
FIG. 6 is a diagram illustrating configuration examples of an OLT and a DBA calculation server in the third embodiment of the signal transfer system.

Next, a specific third embodiment of the signal transfer system 100 will be described with reference to FIGS. 5 and 6. FIG. 5 is a diagram illustrating the third example (transmission from an OLT 61 to a DBA calculation server 7) of the signal transfer system 100. FIG. 6 is a diagram illustrating configuration examples of the OLT 61 and the DBA calculation server 7 in the third embodiment of the signal transfer system 100.

For example, (a plurality of) the ONU 60 is connected to the OLT 61. The ONU 60 and the OLT 61 implement uplink signal control using a multi point control protocol (MPCP). The OLT 61 transmits a signal to the DBA calculation server 7 via the signal transfer device 2.

For example, it is assumed that the priority signal transmitted from the OLT 61 to the DBA calculation server 7 is a bundled report frame. The bundle report frame is generated by a DBA engine 612 when the OLT 61 receives all report frames via a PON interface (IF) 610 in the DBA period.

A DBA thread 70 notifies the OLT 61 of the reception timing of the report frame in advance by bandwidth allocation. In addition, the frame format used for notification is determined in advance between the DBA engine 612 and the DBA thread 70. Therefore, it is possible to recognize the data size in advance.

That is, the signal transfer device 2 can control the priority signal similarly to the other example by receiving the above-described information as the signal information.

Furthermore, the priority signal may be a bundled gate frame. The DBA thread 70 generates a bundled gate frame when receiving the above-described bundle report frame and ending the bandwidth allocation processing, and transmits the bundled gate frame to the DBA engine 612. Therefore, the DBA calculation server 7 can predict the timing at which the processing ends in advance.

In addition, the frame format used for notification is determined in advance between the DBA engine 612 and the DBA thread 70. Therefore, it is possible to recognize the data size in advance.

That is, the signal transfer device 2 can control the priority signal similarly to the other example by receiving the above-described information as the signal information.

As described above, the signal transfer device 2 can predict the arrival time of the traffic to be subjected to the low latency control by acquiring the information indicating the scheduling in advance for the traffic scheduled in the lower network, for example, and can leave a transmission window in advance. Then, the signal transfer device 2 can reduce the delay for one packet.

In addition, some or all of the respective functions of the transmission device 1, the signal transfer device 2, and the reception device 3 may be configured by hardware such as a programmable logic device (PLD) or a field programmable gate array (FPGA), or may be configured as a program executed by a processor such as a CPU.

For example, the signal transfer device 2 according to an embodiment can be implemented by using a computer and a program, and the program can be recorded on a storage medium or provided via a network.

Figure 7:
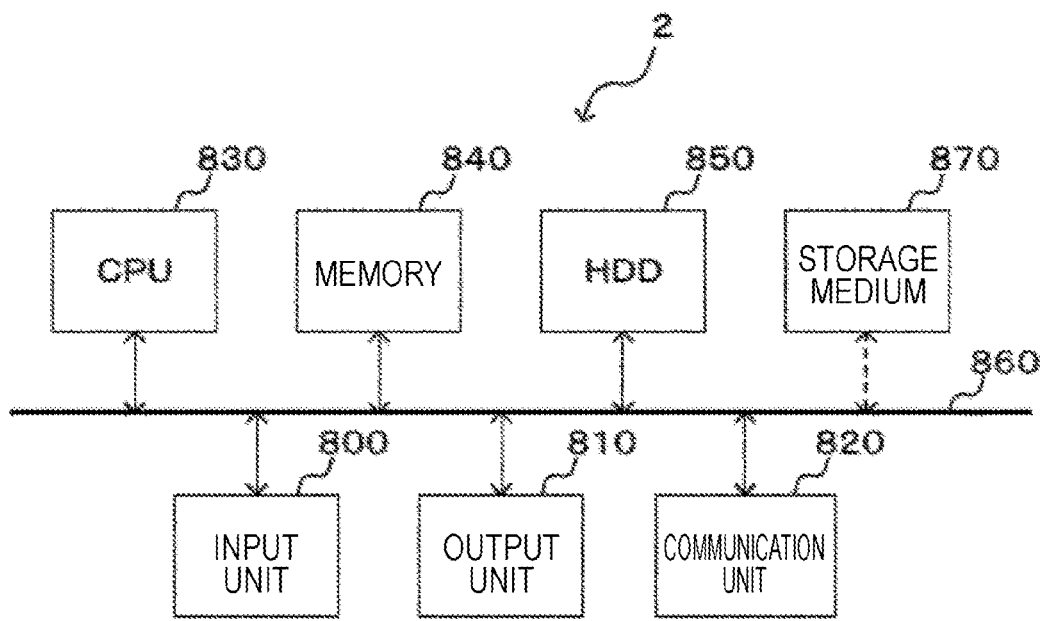
FIG. 7 is a diagram illustrating a hardware configuration example of the signal transfer device according to the embodiment.

FIG. 7 is a diagram illustrating a hardware configuration example of the signal transfer device 2 according to the embodiment. As illustrated in FIG. 7, for example, the signal transfer device 2 has a function as a computer in which an input unit 800, an output unit 810, a communication unit 820, a CPU 830, a memory 840, and an HDD 850 are connected via a bus 860. In addition, the signal transfer device 2 can input and output data to and from a computer-readable storage medium 870.

The input unit 800 is, for example, a keyboard, a mouse, or the like. The output unit 810 is, for example, a display device such as a display. The communication unit 820 is, for example, an optical network interface or the like.

The CPU 830 controls each unit constituting the signal transfer device 2 and performs predetermined processing and the like. The memory 840 and the HDD 850 are storage units that store data and the like.

The storage medium 870 can store a program or the like for executing the function of the signal transfer device 2. Note that the architecture constituting the signal transfer device 2 is not limited to the example illustrated in FIG. 7.

As described above, the signal transfer system 100 according to the embodiment performs control such that the aperiodic signal having a higher priority than the other signals is output from the plurality of buffers 220 in preference to the other signals during the period in which the signal transfer device 2 sets the reservation, and thus, even if the signal to be subjected to the priority control is the aperiodic signal, the delay can be reduced.

REFERENCE SIGNS LIST

1 Transmission device
2 Signal transfer device
3 Reception device
7 DBA calculation server
20 Reception unit
21 Signal distribution unit
22 Buffer unit
23 Time gate unit
24 Control unit
25 Transmission unit
26 Timing calculation unit
40 User terminal
41 ONU
42 OLT
50 User terminal
51 Wireless station
60 ONU
61 OLT
70 DBA thread
220 Buffer
230 Gate
261 Acquisition unit
262 Prediction unit
263 Setting unit
100 Signal transfer system
612 DBA Engine
800 Input unit
810 Output unit
820 Communication unit
830 CPU
840 Memory
850 HDD
860 Bus
870 Storage medium

The invention claimed is:

1. A signal transfer device comprising:
a reception circuitry configured to receive a plurality of signals including an aperiodic signal having a higher priority than other signals;
a plurality of buffers that respectively hold the plurality of signals received by the reception circuitry according to priorities;
an acquisition circuitry configured to acquire signal information including at least one of a time at which the aperiodic signal is transmitted or received and a data length of the aperiodic signal;
a prediction circuitry configured to predict a timing at which the aperiodic signal arrives at the buffer based on the signal information acquired by the acquisition circuitry;
a setting circuitry configured to set reservation of a period during which the aperiodic signal is transmitted in preference to other signals based on the timing predicted by the prediction circuitry;
a control circuitry configured to control such that the aperiodic signal is output in preference to other signals from the plurality of buffers during a period in which the setting circuitry sets reservation; and
a transmission circuitry configured to transmit signals output from the plurality of buffers according to the control of the control circuitry.

2. The signal transfer device according to claim 1, wherein
the reception circuitry is further configured to
receive a signal whose priority is determined in units of a transmission device that transmits a plurality of signals or a signal whose priority is determined in units of a signal flow.

3. The signal transfer device according to claim 1, wherein
the acquisition circuitry is further configured to
acquire signal information including a data length of the aperiodic signal in a case where a time at which the aperiodic signal is transmitted or received is predetermined, and acquires signal information including a time at which the aperiodic signal is transmitted or received in a case where the data length of the aperiodic signal is predetermined.

4. A non-transitory computer-readable storage medium storing a signal transfer program for causing a computer to function as each circuitry of the signal transfer device according to claim 1.

5. A signal transfer method comprising:
receiving a plurality of signals including an aperiodic signal having a higher priority than other signals;
holding the plurality of received signals by a plurality of buffers according to priorities;
acquiring signal information including at least one of a time at which the aperiodic signal is transmitted or received and a data length of the aperiodic signal;

predicting a timing at which the aperiodic signal arrives at the buffer based on the acquired signal information;

setting reservation of a period during which the aperiodic signal is transmitted in preference to other signals based on the predicted timing;

controlling such that the aperiodic signal is output in preference to other signals from the plurality of buffers during a period in which reservation is set; and transmitting signals output from a plurality of the buffers according to the control in controlling.

6. The signal transfer method according to claim 5, wherein in receiving, a signal whose priority is determined in units of a transmission device that transmits a plurality of signals or a signal whose priority is determined in units of a signal flow is received.

7. The signal transfer method according to claim 5, wherein in acquiring, signal information including a data length of the aperiodic signal is acquired in a case where a time at which the aperiodic signal is transmitted or received is predetermined, and signal information including a time at which the aperiodic signal is transmitted or received is acquired in a case where the data length of the aperiodic signal is predetermined.

8. A signal transfer system comprising: a transmission device that transmits one or more signals including an aperiodic signal having a higher priority than other signals; and a signal transfer device that transfers a plurality of signals including the aperiodic signal to a reception device, wherein the signal transfer device includes:

a reception circuitry configured to receive a plurality of signals including the aperiodic signal;

a plurality of buffers that respectively hold the plurality of signals received by the reception circuitry according to priorities;

an acquisition circuitry configured to acquire signal information including at least one of a time at which the aperiodic signal is transmitted or received and a data length of the aperiodic signal;

a prediction circuitry configured to predict a timing at which the aperiodic signal arrives at the buffer based on the signal information acquired by the acquisition circuitry;

a setting circuitry configured to setting reservation of a period during which the aperiodic signal is transmitted in preference to other signals based on the timing predicted by the prediction circuitry;

a control circuitry configured to control such that the aperiodic signal is output in preference to other signals from the plurality of buffers during a period in which the setting circuitry sets reservation; and a transmission circuitry configured to transmit signals output from the plurality of buffers according to the control of the control circuitry.

* * * * *